(12) United States Patent
Miyamoto et al.

(10) Patent No.: US 7,006,039 B2
(45) Date of Patent: *Feb. 28, 2006

(54) MICROWAVE SELF-PHASING ANTENNA ARRAYS FOR SECURE DATA TRANSMISSION & SATELLITE NETWORK CROSSLINKS

(75) Inventors: Ryan Y. Miyamoto, Honolulu, HI (US); Wayne A. Shiroma, Kaneohe, HI (US); Grant S. Shiroma, Hilo, HI (US); Blaine T. Murakami, Mililani, HI (US); Aaron Ohta, Honolulu, HI (US); Michael Tamamoto, Mililani, HI (US)

(73) Assignee: University of Hawaii, Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/911,928

(22) Filed: Aug. 4, 2004

(65) Prior Publication Data

US 2005/0030226 A1    Feb. 10, 2005

Related U.S. Application Data

(60) Provisional application No. 60/579,035, filed on Jun. 10, 2004, provisional application No. 60/506,316, filed on Sep. 25, 2003, provisional application No. 60/493,191, filed on Aug. 5, 2003.

(51) Int. Cl.
   *G01S 3/16*    (2006.01)
   *H01Q 1/00*    (2006.01)
(52) U.S. Cl. .............................. 342/370; 342/15; 455/1
(58) Field of Classification Search ................ 342/370, 342/15; 455/1
   See application file for complete search history.

(56) References Cited

U.S. PATENT DOCUMENTS

| | | | |
|---|---|---|---|
| 3,394,374 A | | 7/1968 | Weiss |
| 3,611,381 A | | 10/1971 | Prelschaf |
| 3,731,313 A | * | 5/1973 | Nagai .......................... 342/370 |
| 4,107,609 A | * | 8/1978 | Gruenberg .................. 342/367 |

(Continued)

OTHER PUBLICATIONS

B.T. Murakami et al., Self-Steering Antenna Arrays for Distributed Picosatellite Networks, 17$^{th}$ Annueal AIAA/USU Conference on Small Satellites, p. 1-5, Aug. 2003.*

(Continued)

*Primary Examiner*—Thomas H. Tarcza
*Assistant Examiner*—Fred H. Mull
(74) *Attorney, Agent, or Firm*—Leighton K. Chong

(57) ABSTRACT

A high-directivity transponder system uses a dual system of a retrodirective array transmitting a data signal peak toward an interrogator source, and a self-null-steering array transmitting a null toward the interrogator source and a jamming signal elsewhere, resulting in high S/N reception at the interrogator source and avoidance of interception. Integrating modulators would allow each array to transmit different data while the spectra of the transmitted signals are identical, thus disabling interception. The system enables secure point-to-point communications and can be used for short-distance wireless data transmission systems such as wireless LAN and RFID servers. As another aspect, self-steering signal transmission is employed for randomly oriented satellites using circularly polarized, two-dimensional retrodirective arrays. Quadruple subharmonic mixing is used as an effective means of achieving phase conjugation when a high-frequency LO is not feasible or inapplicable. These features may be used for small-satellite communications, secure tactical communications, search and rescue, enemy location fixing and tracking, UAV command and control, forest fire detection, marine-based tracking, and many other applications requiring secure communications with high signal directivity.

17 Claims, 8 Drawing Sheets

U.S. PATENT DOCUMENTS

| | | | |
|---|---|---|---|
| 4,246,585 | A | 1/1981 | Mailloux |
| 4,641,259 | A | 2/1987 | Shan |
| 4,849,764 | A | 7/1989 | van Heyningen |
| 5,781,845 | A | 7/1998 | Dybdal |
| 6,480,522 | B1 | 11/2002 | Hoole |
| 2003/0086366 | A1 | 5/2003 | Branlund |
| 2003/0123384 | A1 | 7/2003 | Agee |
| 2003/0231700 | A1 | 12/2003 | Alamouti |
| 2004/0095907 | A1* | 5/2004 | Agee et al. ................. 370/334 |

OTHER PUBLICATIONS

W.A. Shiroma et al., Progress in retrodirective arrays for wireless communications, IEEE Topical Conference on Wireless Communication Technology, p. 80-81, Oct. 2003.*

S.S. Sung et al., Retrodirective antenna technology for CubeSat networks, IEEE Topical Conference on Wireless Communication Technology, p. 220-221, Oct. 2003.*

R.Y. Miyamoto et al., A high-directivity transponder using self-steering arrays, IEEE MTT-S International Microwave Symposium Digest, vol. 3, p. 1683-1686, Jun. 2004.*

B.T. Murakami et al., A quadruple subharmonic phase-conjugating array for secure picosatellite crosslinks, IEEE MTT-S International Microwave Symposium Digest, vol. 3, p. 1687-1690, Jun. 2004.*

"Retrodirective Arrays for Wireless Communications", by R. Miyamoto, T. Itoh, IEEE Microwave Magazine, pp. 71-79, Mar. 2002.

"Retrodirective Array Using the Heterodyne Technique", by C. Pon, IEEE Transactions on Antennas and Propagation, pp. 176-180, Mar. 1964.

"Fully MMIC 76 GHz Radar for ACC", by H. Kuroda et al, Conference Proc. 2000 IEEE Intelligent Transportation Systems, pp. 299-304, Oct. 2000.

"Multiple Emitter Location and Signal Parameter Estimation", by R. Schmidt, IEEE Transactions on Antennas and Propagation, vol. AP-34, No. 3, Mar. 1986, pp. 276-280.

* cited by examiner

Retrodirective array configuration

Self-null-steering array configuration

MICROWAVE SELF-PHASING ANTENNA ARRAYS FOR SECURE DATA TRANSMISSION & SATELLITE NETWORK CROSSLINKS

This U.S. patent application claims the priority of U.S. Provisional Application No. 60/579,035, of Miyamoto et al., filed on Jun. 10, 2004, entitled "Secure Data Transmission Systems Using Microwave Self-Phasing Arrays", U.S. Provisional Application No. 60/506,316 filed on Sep. 25, 2003, of Miyamoto et al., of the same title, and U.S. Provisional Application No. 60/493,191, filed on Aug. 5, 2003, of Shiroma et al., entitled "Self-Steering Antennas for Satellite Network Crosslinks".

This subject matter was developed in part under a research grant provided by the U.S. Government, National Science Foundation, and in part by the University Nanosat Program, Air Force Office of Scientific Research. The U.S. Government retains certain rights in the invention.

TECHNICAL FIELD

This invention generally relates to microwave self-phasing antenna arrays, and more particularly, to self-phasing arrays adapted to secure data transmission and for satellite network crosslinks.

BACKGROUND OF INVENTION

Self-steering arrays are promising substitutes for expensive smart antenna systems in simple line-of-sight communication environments. One of the most popular self-steering array technologies is the retrodirective array, which automatically sends a signal back to an interrogating source, without any phase shifters or digital signal processing, as referenced in the overview by R. Y. Miyamoto and T. Itoh, "Retrodirective arrays for wireless communications," *IEEE Microwave Magazine*, pp. 71–79, March 2002. The enhanced communication link between the retrodirective array and interrogator arising from this self-steering feature makes it useful for multi-user communications schemes such as space division multiple access (SDMA) or multi-transponder (satellite) networks. To increase user capacity in SDMA, interception and interference is minimized by increasing the array directivity, implying that a large number of array elements are needed. However, this increases the size and cost of the system.

There have been many studies to effectively increase the directivity of an array without increasing the number of elements. One example is null steering, which is often used in monopulse radar systems and direction-of-arrival (DOA) estimation algorithms, as a null can provide much higher resolution than a beam. While these techniques have typically been used in receivers, secure data exchange systems require high directivity for transmission as well.

Other techniques to obtain high directivity for transmission have been developed in different applications. U.S. Patent Application 2003/0231700 to Alamouti et al. discloses a phased steering array of vertically spaced antennas to give vertical spatial adaptivity to a wireless discrete multitone spread spectrum (DMT-SS) communications system. This enables the automatic positioning of a beam in the vertical direction to position nulls where interferers are located on the same azimuth, but separated in elevation. U.S. Patent Application 2003/0123384 to Agee discloses a "stacked-carrier" spread spectrum (SCSS) communication system which is combined with retrodirective array, code-nulling, and interference canceling techniques. For example, soft nulls of the transmitted signal can be directed toward interference sources, and code-nulling and retrodirective beam steering techniques can be combined in adaptive antenna arrays to improve the range of a conventional transceiver, and also to increase the capacity of a communications network by allowing tighter spatial packing. U.S. Patent Application 2003/0086366 to Branlund et al. discloses an adaptive communications method for multi-user packet radio wireless networks using code preambles to identify signals from/to remote units.

U.S. Pat. No. 6,480,522 to Hoole et al. (AT&T) discloses a stacked carrier DMT-SS communication method based on frequency domain spreading, and including code-nulling techniques for interference cancellation and enhanced signal separation. U.S. Pat. No. 5,781,845 to Dybdal et al. (Aerospace Corp.) discloses an adaptive transmitting antenna array which can adjust phased weighting coefficients to produce soft nulls in the direction of reflective objects which would otherwise cause multipath distortions. U.S. Pat. No. 4,849,764 to Heyningen (Raytheon) discloses an adaptive antenna array which uses an inverse beamformer to subtract out signal components from the direction of an interfering signal to enhance reception from a target signal source. U.S. Pat. No. 4,641,259 to Shan et al. (Stanford U.) discloses an adaptive antenna array which uses a smoothing operation to obtain a feedback signal to suppress interfering signals. U.S. Pat. No. 4,246,585 to Mailloux (USAF) discloses an adaptive antenna array which uses deterministic and adaptive null steering for improved null control of the signal beam. U.S. Pat. No. 4,107,609 to Gruenberg discloses a communication transponder system which uses two antenna arrays, a first array of which receives a signal from a first station direction and transmits a second signal with a null in the first station direction, and a second array coupled to the first array which transmits a beam peak of the second signal in a second station direction.

However, despite these developments in the prior art, it would be desirable to provide a secure data transmission method for microwave self-phasing antenna arrays wherein the signal-to-noise ratio (SNR) for data transmission toward a target can be maximized while minimizing interception in other directions. It would also be desirable to achieve this objective without the complexities associated with the prior art.

In a related area, there has been considerable interest in small satellites for various applications as described, for example, by H. Heidt, et al., "CubeSat: a new generation of picosatellite," in *Proc. of the 14$^{th}$ Annual AIAA/USU Conference on Small Satellites*, Logan, UT, August 2001. The smaller mass of nanosatellites (10 kg) and picosatellites (1 kg) make them more economical to develop and launch into orbit. Networks of small satellites promise increased mission flexibility and success by distributing the tasks and subsystems typical of a single large satellite. An autonomous small-satellite network also reduces the possibility of catastrophic single-point failure; if one small-satellite fails, others can take up the slack until a replacement is launched. However, the challenge in designing a distributed small-satellite network—especially a dynamically reconfigurable one—is in establishing and maintaining a reliable crosslink with other satellites in the network without a priori knowledge of their positions.

Omnidirectional antennas are the obvious choice for crosslinking satellites that are subject to constant repositioning, but this leaves the network susceptible to eavesdropping by unauthorized ground stations as well as by satellites outside the network. Omnidirectional antennas are also inefficient, as power is radiated in all directions, not just in the direction of the receiver. In covert or security-sensitive networks, signal interception can be prevented by employing direct crosslinks with conventional phased-array antennas. However, for picosatellites in the 1000- to 1500-cubic-cm range, processing power is a valuable resource and dynamic beam steering would add another layer of complexity to the system, negating the advantages of the simple, low-cost features of these small satellites. It may also be desirable to provide for secure data transmission where the signal-to-noise ratio toward a target is maximized while minimizing interception in all other directions.

SUMMARY OF INVENTION

In accordance with a first aspect of the present invention, a secure data transmission method provides high directivity toward a target by employing a dual self-phasing array system with a retrodirective array to direct a transmission signal peak toward the target, and a self-null-steering array to direct a null toward the target and a jamming signal in other directions. The superimposing of a data signal peak with a jamming signal null maximizes the signal-to-noise (SNR) ratio toward the target while sending a jamming signal in the other directions. The dual array system of the invention can provide super-high directivity using just two small antenna arrays, thus making the system suitable for small-platform environments, such as mobile or extraterrestrial environments, while increasing the relative user capacity in wireless communication systems. The dual antenna arrays can be integrated together in a single layout to further reduce size and weight.

In accordance with a second aspect of the present invention, self-steering retrodirective antenna arrays are used for secure crosslink communications between a network of small-platform transponders (small-satellites) moving randomly in space. Retrodirective antennas are able to sense the direction of an incoming radio transmission and send a reply back in that same direction, without the complexities associated with phase shifters in conventional phased arrays or digital signal processing in smart antennas. The high directivity associated with retrodirective arrays not only improves network security, but also improves the communication link efficiency by minimizing power consumption. To accommodate self-steering for randomly oriented satellites in space, the retrodirective array employ circularly polarized, two-dimensional steering. A novel use of quadruple subharmonic mixing can achieve phase conjugation in a manner that relaxes the requirement on the local oscillator frequency compared to more conventional designs. The satellite network for crosslink communications can also employ the aforementioned dual array system to direct a transmission signal peak superimposed with a jamming signal null toward a target for secure, high directivity transmission.

Other objects, features, and advantages of the present invention will be explained in the following detailed description of the invention having reference to the appended drawings.

DETAILED DESCRIPTION OF INVENTION

Figure 1:
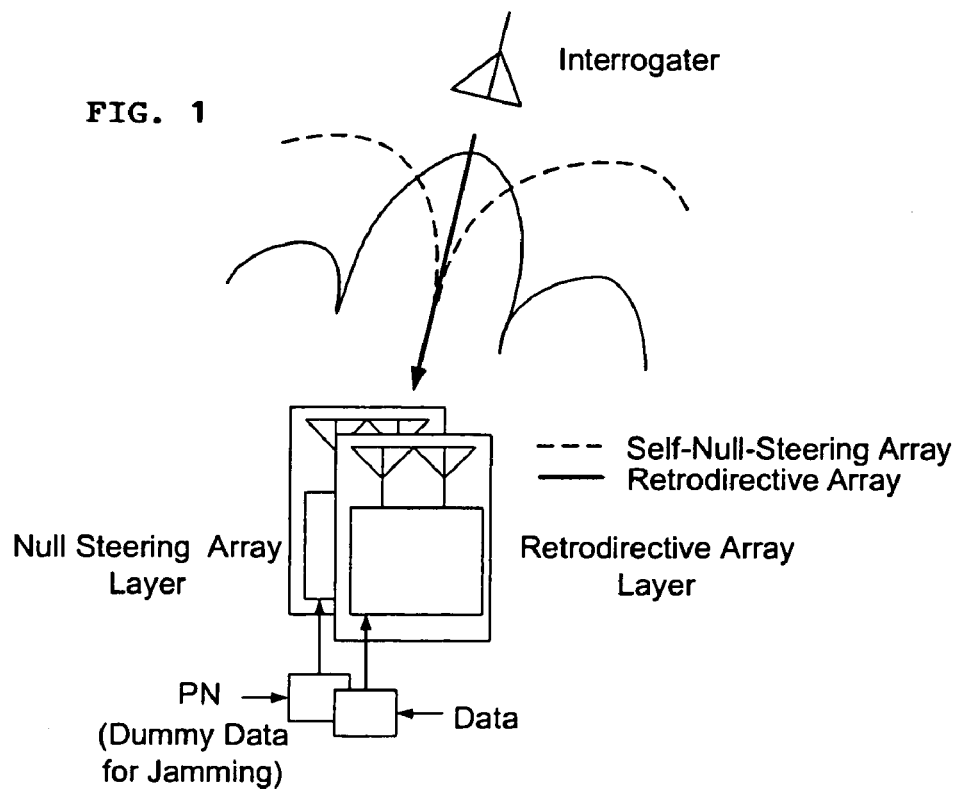
FIG. 1 is a schematic illustration of a high-directivity transponder system in accordance with the present invention employing a dual system of a retrodirective array and a self-null-steering array.

An illustration of the first aspect of the invention is shown in FIG. 1. A high-directivity transponder system for secure data transmission employs two types of self-steering arrays: a retrodirective array 10 for transmitting a data signal with a directed peak and a self-null-steering array 12 for transmitting a jamming signal with a directed null. When these arrays are interrogated 14, the retrodirective array 10 transmits a signal beam with a peak directed toward the interrogator source (indicated by the continuous line waveform), while the self-null-steering array sends a jamming signal in other directions, with a null directed toward the interrogator source (indicated by the dashed line waveform). Due to reception of the data signal peak superimposed on the jamming signal null, the interrogator can demodulate the true data reliably without suffering from the jamming signal. In other directions outside of the null beamwidth, the jamming signal power exceeds that of the residual communication signal, thereby disabling interception. Therefore, the system can effectively provide super-high directivity at a high signal-to-noise ratio.

Figure 2:
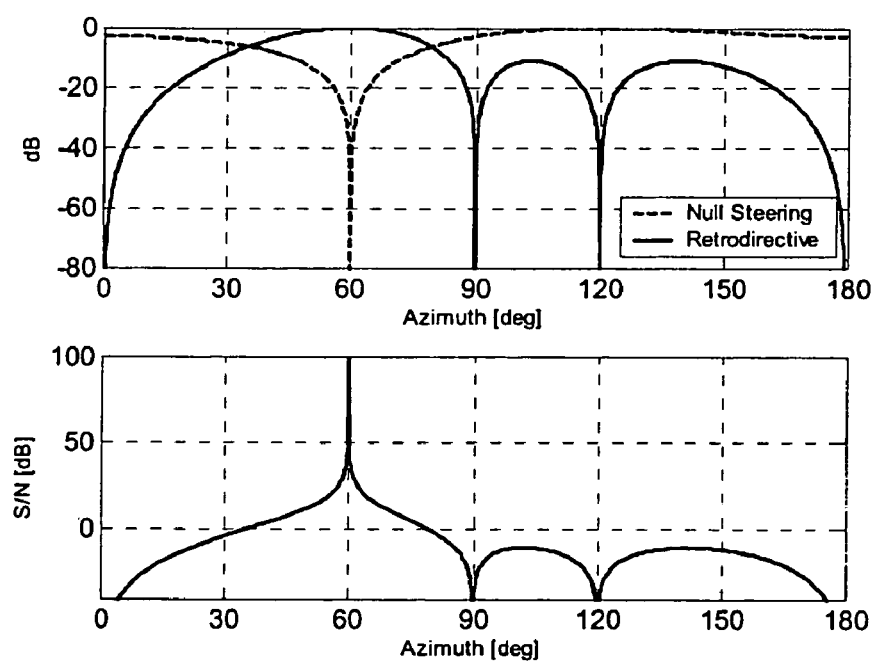
FIG. 2 shows simulated graphs for radiation intensity and signal-to-noise ratio for the dual array system with an interrogating source at 60°.

FIG. 2 shows graphs of simulated radiation intensity and signal-to-noise ratio (SNR) for the dual array system with an interrogating source at 60°. A peak signal at 0 dB is superimposed with a jamming signal null of −80 dB at the interrogator position. As a result, a very high SNR is received at the interrogator position. This example is based on using a simple four-element retrodirective array and a two element self-null-steering array.

The computational relations for the simulated example are derived as follows. The array factor of an N-element uniform array on the z-axis is given by $$AF(\psi) = \left[ \frac{\sin\left(\frac{N}{2}\psi\right)}{\sin\left(\frac{1}{2}\psi\right)} \right] \quad (1)$$

where ψ=kd cos θ+α. The array factor, AF becomes zero when ψ=2π/N, and therefore we can place a null at θ=θ' with a progressive phase:

$$\alpha = -kd \cos \theta' + 2\pi/N \quad (2)$$

When the array is illuminated with an interrogating signal from an angle θ', each element is excited with a progressive phase of ψ=kd cos θ'. Therefore, the progressive phase in equation (2) can be generated by adding 2π/N to the phase conjugate of the received signal. This can be achieved by applying an LO with a progressive phase to phase-conjugating mixers. The received interrogating signal at the n-th element of an N-element array is $$V_{nRF} = V_{RF} \cos(\omega_{RF} t + \phi_n) \quad (3)$$

where $\phi_n$ is the phase of the received interrogating signal at the n-th element. Assume the LO signal applied to each element is given by:

$$V_{nLO} = V_{LO} \cos(\omega_{LO} t + 2\pi n/N) \quad (4)$$

Note that the LO signal is applied to each element of the array with a progressive phase of 2π/N. Then, the mixing product is given by:

$$V_{IF} = V_{RF}\cos(\omega_{RF}t + \phi_n) \cdot V_{LO}\cos(\omega_{LO}t + 2n\pi/N) \quad (5)$$

$$= \frac{1}{2} V_{RF} V_{LO} \left[ \begin{array}{l} \cos((\omega_{LO} - \omega_{RF})t - \phi_n + 2n\pi/N) + \\ \cos((\omega_{LO} + \omega_{RF})t + \phi_n + 2n\pi/N) \end{array} \right]$$

When $\omega_{LO} = 2\omega_{RF}$, $\cos((\omega_{LO}-\omega_{RF})t-\phi_n)$ is the phase conjugate of the received signal. Therefore, the lower sideband of equation (5) is the phase conjugate of the received signal plus a progressive phase of 2π/N. A radiation null should occur at θ' when each antenna element of the array is re-excited using that mixing product.

For a two-element array, this can be achieved by applying an LO to each phase conjugator though a rat-race coupler. A novel approach in the invention is to use diodes that are mounted oppositely at each element of the array. The LO is then applied in phase but the current flows in opposite directions and turns the diodes on and off, making it equivalent to applying an anti-phase LO. With the rest of the circuitry in symmetric configuration, better signal cancellation (i.e., a deeper null) is obtained compared to the rat-race approach.

Figure 3:
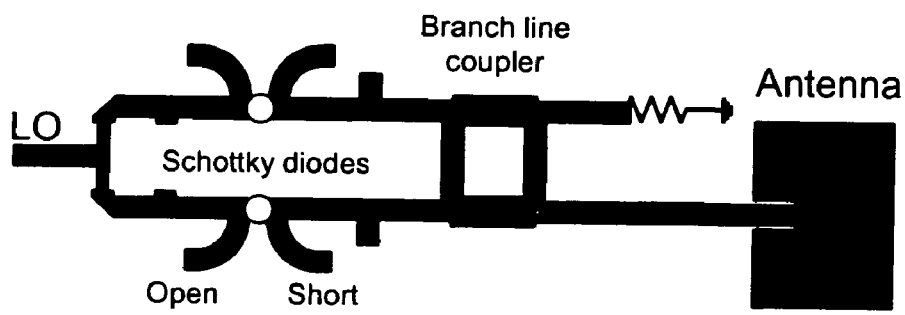
FIG. 3 shows a layout for a novel phase conjugating element using Schottky diodes.
Figure 4:
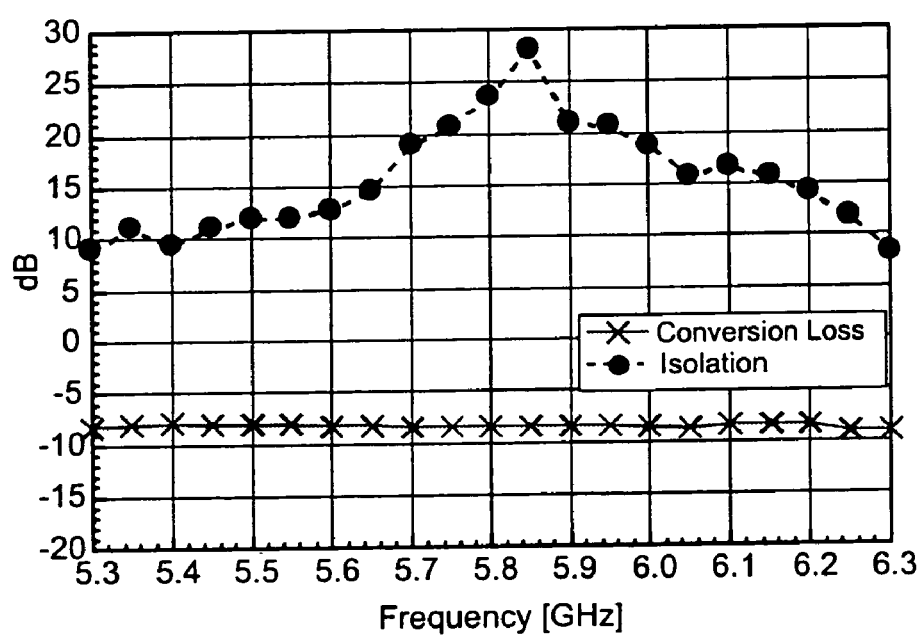
FIG. 4 is a graph showing conversion loss and IF-RF isolation measurement results.

FIG. 3 shows an example of the novel phase-conjugating circuit fabricated on an RT/duroid substrate (εr=2.2, 0.07874 cm thickness). The circuit was optimized for 5.8 GHz. The heterodyne balanced mixer employs GaAs Schottky diodes mounted in the same direction. RF is applied 90° out of phase through a branchline coupler whereas the LO is applied in phase. The rejected RF is dumped into the terminated port of the branch line coupler, while the phase-conjugated signal (IF) is returned to the antenna port. To test the circuit performance, the antenna is replaced with a directional coupler. RF ($f_{RF}$=5.3–6.3 GHz, $P_{RF}$=30 dBm) and LO signals ($f_{LO}$=11.6 GHz, $P_{LO}$=5 dBm) are applied to the balanced mixer. The output signal is measured at the coupled port of the directional coupler. The conversion loss and IF-RF isolation was measured and is shown in FIG. 4. The conversion loss ("X" line) remained almost constant, and at the same time, the IF-RF isolation (bold dotted line) remained over 10 dB across the entire frequency range, with a peak at about 5.8 GHz.

Figure 5A:
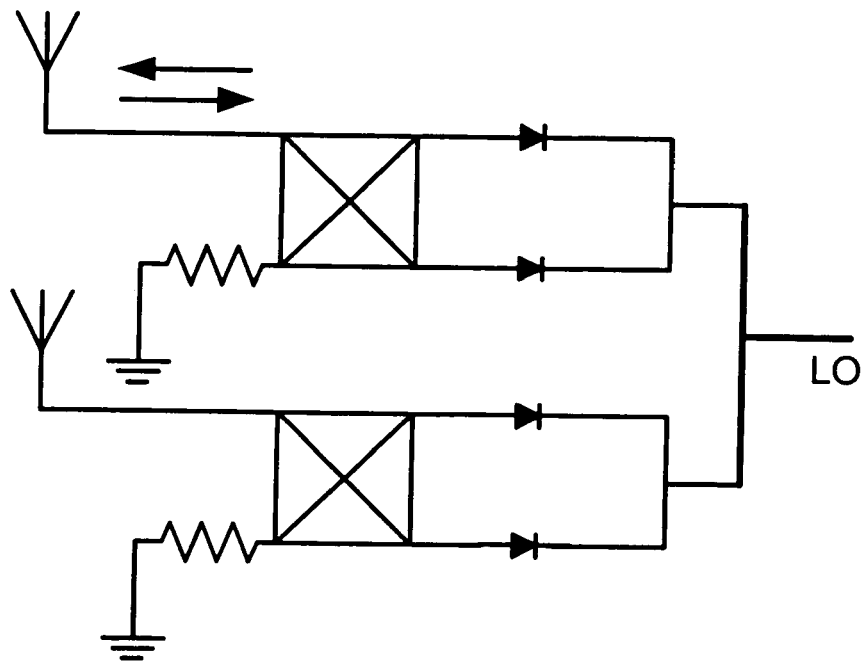
FIG. 5A is a schematic diagram of a basic retrodirective array configuration.
Figure 5B:
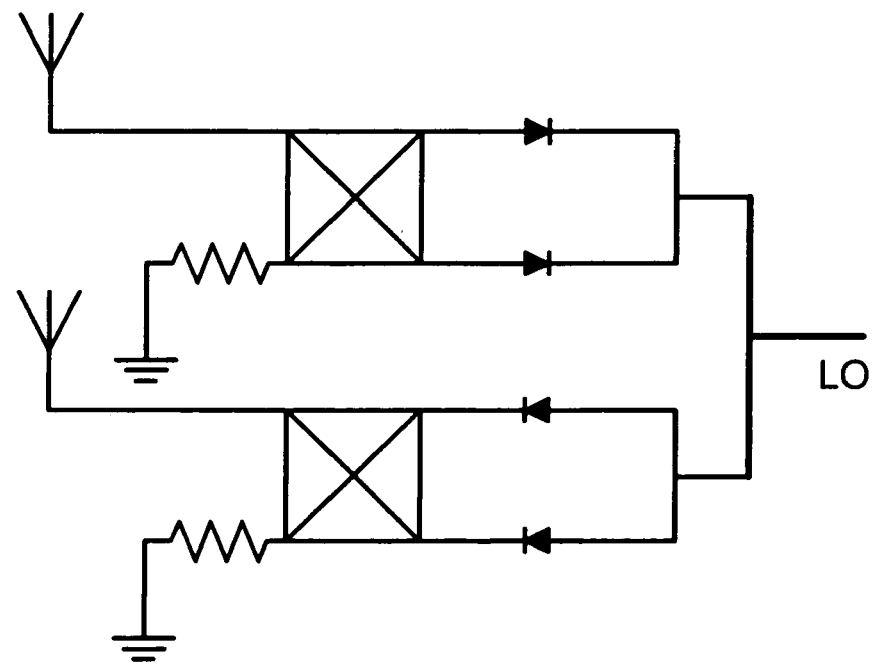
FIG. 5B is a schematic diagram of a basic self-null-steering array configuration.

Two-element prototype arrays were built using the phase conjugating elements based on the architecture in FIG. 3. As shown in FIG. 5A, the diodes in the retrodirective array were all mounted in the same direction, serving as conventional phase-conjugating mixers. In FIG. 5B, the diodes in each element of the null-steering array are mounted in opposite directions so that the current flows opposite while an LO signal is applied in phase. This configuration eliminates the need for a ratrace coupler or an extra delay line to create an anti-phase LO signal, simplifying the LO network.

Figure 6:
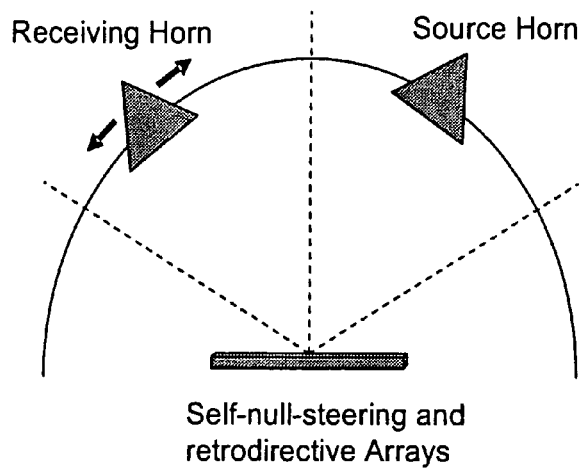
FIG. 6 illustrates an example of a radiation measurement setup for the retrodirective and self-null-steering arrays.

Radiation patterns of the arrays were measured with interrogating sources at different angles, as shown in the measurement setup illustrated in FIG. 6. The arrays were illuminated by an interrogating source at a fixed angle. The responses from the arrays were measured at different angles (−60° to 60°). The RF was set to 5.81 GHz to offset the RF and IF frequencies by 20 MHz to distinguish the transponding signal from the interrogating signal. Also, a slightly different LO frequency (1 MHz offset) was used for each array so that the signals from the retrodirective and self-null-steering arrays could be differentiated. Note that the frequency offsets were used for measurement purposes only, and in a real system, the carrier frequencies of the arrays must be the same so that the spectra overlap each other. The signal-to-noise ratio was defined as the power ratio between the signals from the retrodirective and self-null-steering arrays:

$$S/N = \frac{P_{retrodirective}}{P_{null-steering}} \quad (6)$$

Figure 7A:
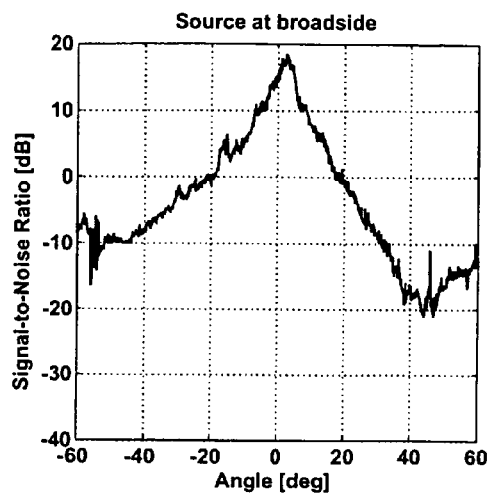
FIG. 7A is a graph of SNR vs. angle with the interrogator source facing broadside.
Figure 7B:
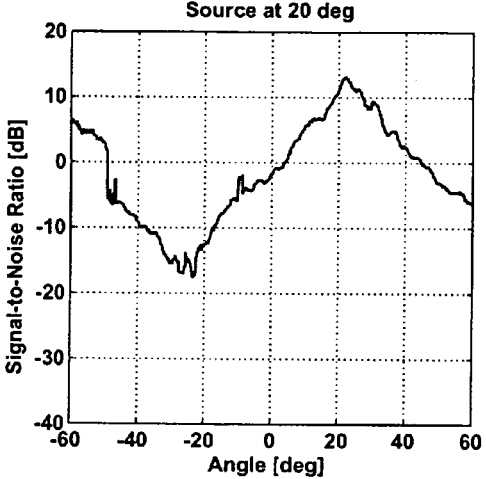
FIG. 7B is with the interrogator source at 20°.
Figure 7C:
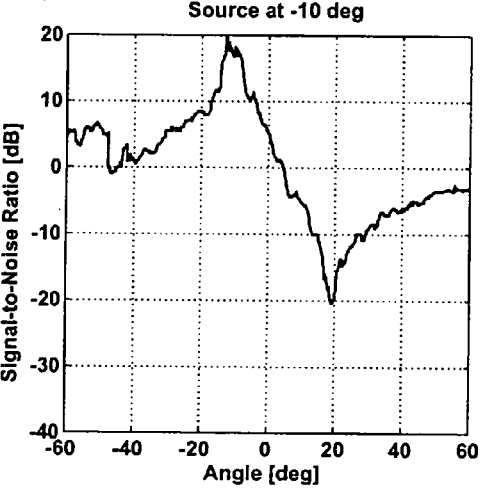
FIG. 7C is with the interrogator source at −10°.

Measured S/N patterns are shown in FIGS. 7A–7C (interrogating source at broadside, 20°, and −10°). The S/N peak is always in the direction of the interrogator. The results show that the SNR directivity is significantly increased compared to that of a typical two-element retrodirective array. As scanned away from broadside, the sidelobe level increased. The equality of the two elements in the null steering array that determines the depth of the null can be improved by better fabrication processes, increasing the S/N at the peak.

The retrodirective and self-null-steering arrays need not be formed in separate layers but may be integrated in a common circuit. The dual arrays transmit different (true vs. jamming) data, but the spectra of the transmitted signals are kept identical by transmitting at the same data rate, thus disabling interception. The dual array system ensures that a high SNR reception is obtained at the interrogator source while disabling interception in other directions for secure point-to-point communications. The dual array system can be used for short-distance wireless data transmission systems such as wireless LAN and RFID servers. It may also be used by satellite TV companies to prevent piracy of TV signals from satellites in surrounding regions.

Figure 8:
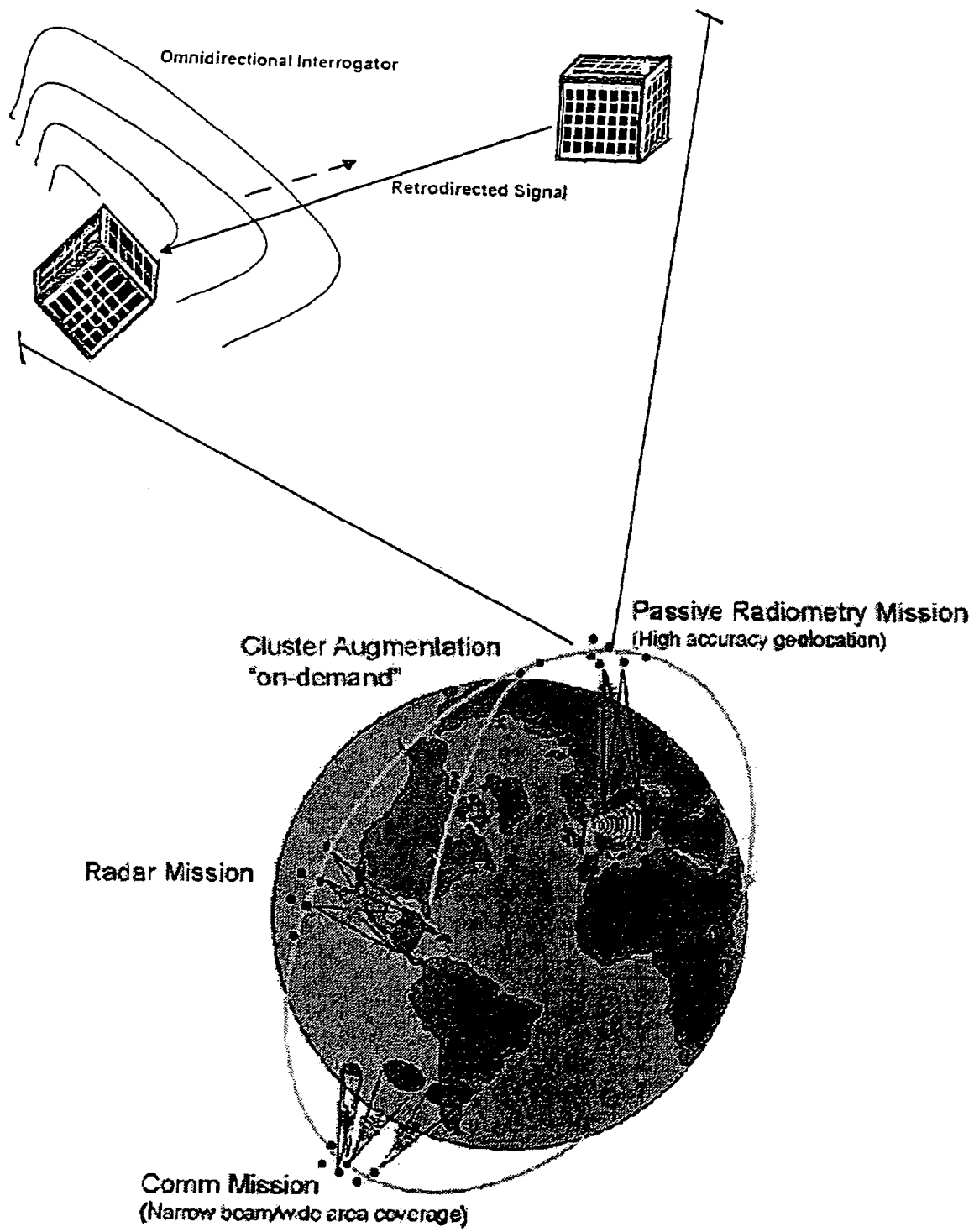
FIG. 8 is a schematic illustration of a network of small-platform transponders (picosatellites) in space using self-steering arrays for secure crosslink communications.

FIG. 8 illustrates a second aspect of the invention in which self-steering retrodirective antenna arrays are used for secure crosslink communications in a network of small-platform transponders (satellites) in space. A network of small satellites may be desired for survivability, redundancy, and/or spatial coverage in applications such as high-accuracy geolocation, cluster augmentation, radar detection, and narrow-beam/wide-area communications. The small satellites may drift in position, such that their motion relative to an interrogator source and to each other is essentially random. Using retrodirective arrays, the small-satellite network can direct a signal beam to an interrogator source in any direction, and to other satellites. This avoids the complexities associated with using phase shifters in conventional phased arrays or digital signal processing in smart antennas. They not only improve network security, but also improve the communication link efficiency by minimizing power consumption.

Although retrodirective technology has been around since the 1960s, designing for space applications presents new challenges. First, the zero-gravity, free-floating nature of the satellites necessitates two-dimensional tracking—and therefore a two-dimensional retrodirective array. Secondly, since the satellites are often too small to have attitude-control systems, it is impossible to know the orientation of each satellite. The antennas will therefore have to provide circular polarization to allow signal reception and prevent polarization mismatch regardless of each satellite's orientation with respect to the other.

In the present invention, a retrodirective array is designed for 10.5 GHz—a frequency that not only minimizes the array size to fit within a small 10×10×15 cm form factor, but also is an allowable frequency in the amateur satellite band. The most popular method of achieving retrodirectivity is the heterodyne technique, in which the incoming radio-frequency (RF) signal at each element is mixed with a local-oscillator (LO) signal at twice the RF signal frequency, producing an intermediate-frequency (IF) signal that has the same frequency as the RF, but with a conjugate phase. However, a subharmonic mixing approach using anti-parallel diodes is well suited for high-frequency systems as it eliminates the need for a high-frequency LO, as suggested in T. Brabetz, et al., "Balanced subharmonic mixers for retrodirective-array applications," *IEEE Trans. Microwave Theory Tech.*, vol. 49, pp. 465–469, March 2001. Previously reported phase-conjugators based on the subharmonic mixing all use third-order mixing ($f_{IF}=2f_{LO}-f_{RF}$), allowing the use of an LO in the same band as the RF. However, this approach suffers from large LO leakage as the fundamental LO frequency overlaps the RF, and cannot be filtered.

Figure 9:
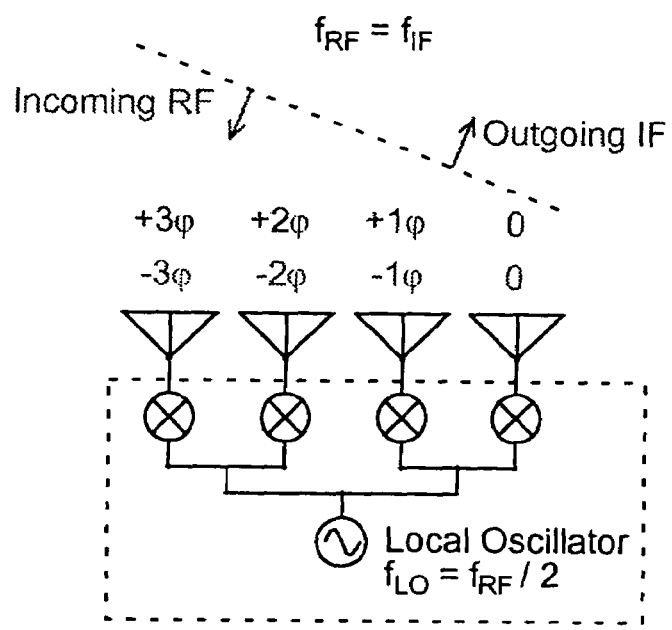
FIG. 9 is a schematic diagram of a phase-conjugating array using subharmonically pumped mixers.

Therefore, in the present invention, the quadruple subharmonic mixing approach was adapted utilizing the fifth-order mixing product ($f_{IF}=4f_{LO}-f_{RF}$). As shown in FIG. 9, this approach uses an LO frequency that is half the RF. Anti-parallel diodes suppress the second harmonic of the LO, which would be at the same frequency of the RF. The phase-conjugating operation through the quadruple subharmonic mixing is explained as follows:

$$V_{if} \propto [V_{lo}\cos(\omega_{lo}t) + V_{rf}\cos(\omega_{rf}t+\theta)]^5 + \dots \quad (7)$$

$$V_{if} \propto \frac{5}{16} \cdot V_{lo}^4 \cdot V_{rf}\cos(4\omega_{lo}t - \omega_{rf}t - \theta) + \dots$$

If $2\omega_{LO}=\omega_{RF}$, the right hand side of equation (7) becomes the phase conjugate of the incoming RF signal. Other odd-order mixing terms can be easily filtered out.

Figure 10:
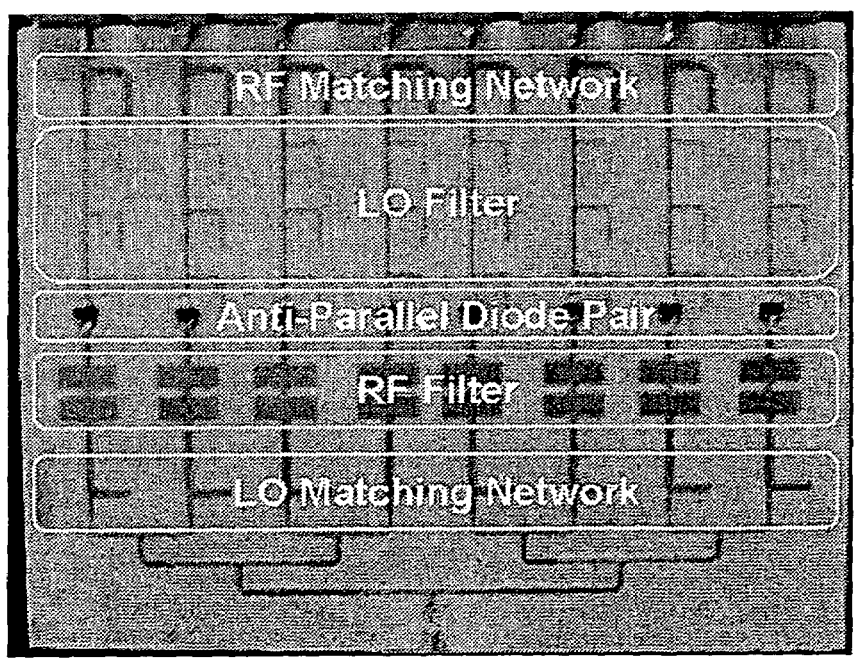
FIG. 10 shows the mixer having an anti-parallel diode pair, matching networks at the LO and RF ports, and bandstop filters at the RF and LO frequencies

FIG. 10 shows an example of such a mixer, which uses Agilent HSMS-8202 series-pair diodes connected in an anti-parallel configuration. The microstrip filters and matching networks are printed on Rogers TMM4 substrate ($\epsilon_r=4.5$, h=0.0381 cm). The measured isolation between the IF and fundamental LO is 65 dB. The rejection of the LO second harmonic is 55 dB, which is superior to conventional third-order mixing. The measured conversion loss of the subharmonic mixer is 26 dB.

Figure 11:
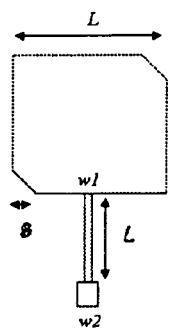
FIG. 11 illustrates a patch antenna element.

As shown in FIG. 11, the antenna element is designed as a square microstrip patch, mitered at opposite ends to achieve two different resonant modes. Circular polarization is achieved when the two modes are orthogonal to each other and 90° out of phase. The antenna is fabricated on Rogers TMM3 substrate ($\epsilon_r=3.27$, h=0.0635 cm). In this example, the patch antenna element has dimensions L=0.762 cm, c=0.102 cm, w1=0.0457 cm, l=0.541 cm, w2=0.150 cm.

Figure 12:
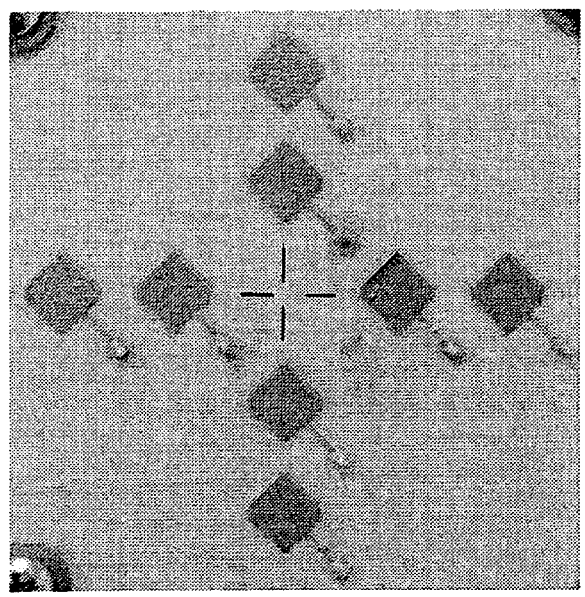
FIG. 12 shows a circularly polarized cross-shaped microstrip patch antenna array.

Significant retrodirectivity requires an array of at least four elements per dimension. Conventionally, this is achieved with a 4×4 array layout. To reduce circuit size and required feed power, a cross-shaped array, as laid out in FIG. 12, consisting of four elements in two orthogonal dimensions was used instead, reducing the amount of elements from 16 for the conventional array to eight elements. The array spacing was 0.484λ=1.383 cm between elements. The resonant frequency was 10.5 GHz.

Figure 13:
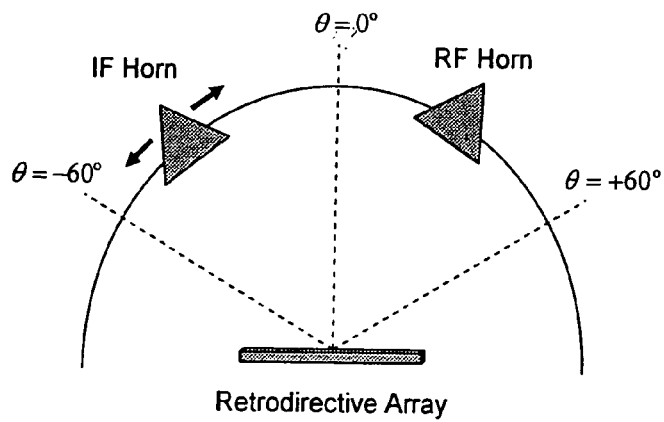
FIG. 13 illustrates a setup for bistatic RCS measurement of the retrodirective array.
Figure 14A:
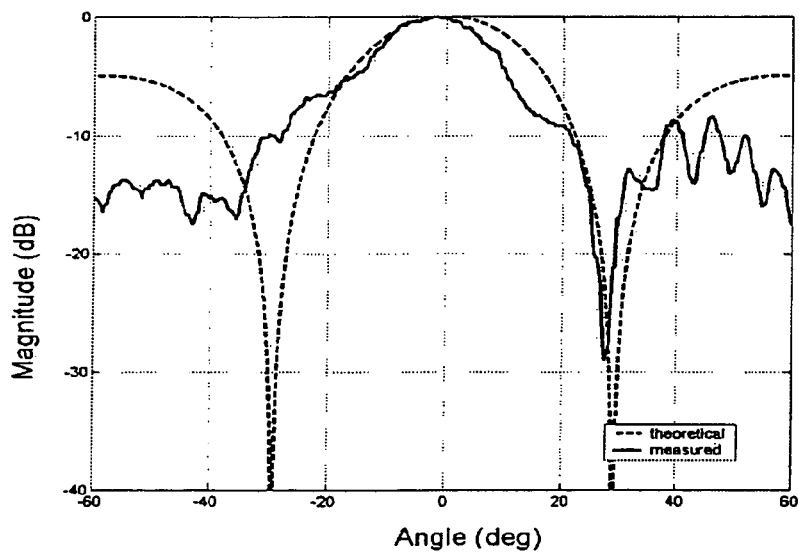
FIGS. 14A–14C show bistatic measurements at 0°, +20°, and −20° for the given example.
Figure 14B:
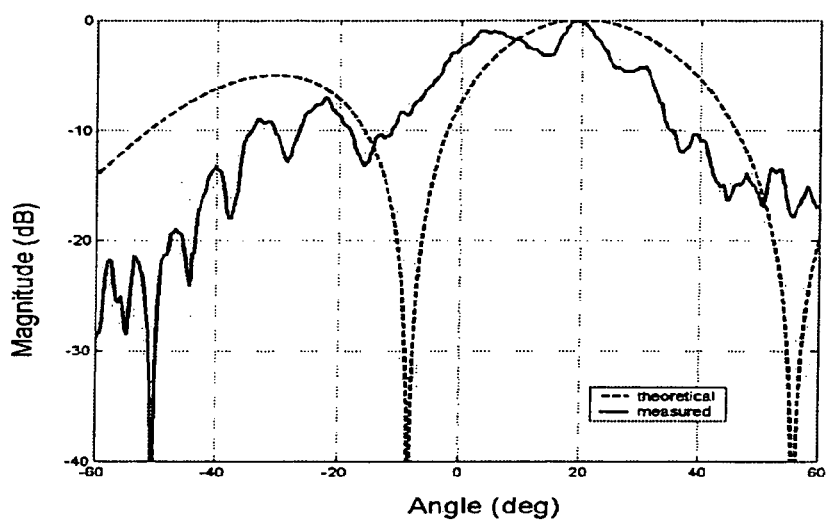
Figure 14C:
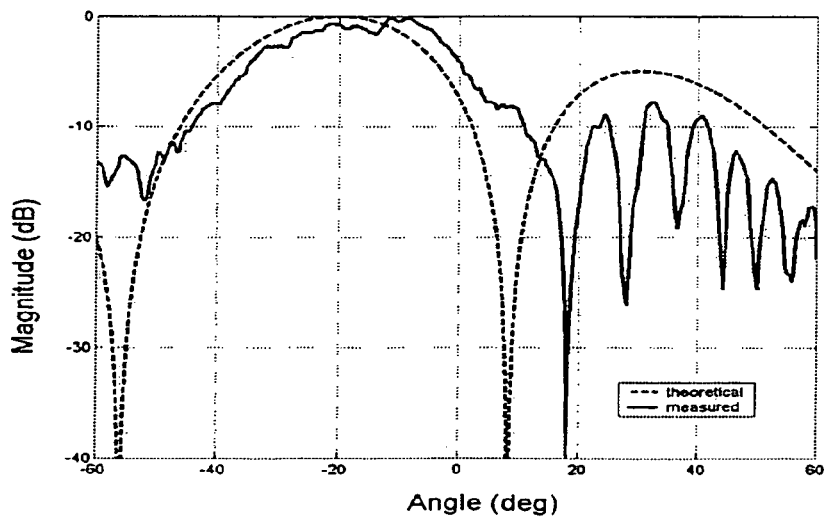

FIG. 13 illustrates the typical method of characterizing a retrodirective antenna array. A stationary horn antenna provides the RF interrogating signal. Once the RF signal impinges on the array under test, the retrodirected IF signal is reflected back, ideally in the same direction as the RF horn. A second horn antenna, scanned over a 120° azimuthal range, picks up this reflected IF signal. A characteristic peak in the pattern should occur in the same direction of the source. Nulls should also occur as a result of the array directivity. Since the incident RF and retroreflected IF signals share common frequencies, there is always unavoidable leakage from the RF horn to the IF horn. In practice, this problem is overcome by slightly offsetting the frequencies so that the two signals can be resolved on a spectrum analyzer. Therefore, the following frequencies were used: LO signal of 5.2375 GHz (fourth subharmonic of 20.95 GHz), RF signal of 10.45 GHz, and IF signal of 10.5 GHz. To ensure that 2D retrodirectivity is achieved, FIG. 14 illustrates measurements for bistatic radar cross section with the source positioned at (a) 0°, (b) +20°, and (c) −20°, taken along the 45° cut of FIG. 12, not along the 0° or 90° axes linear arrays are aligned. The polarization ellipse was also measured and found to be 5.5 dB.

The form factor typically associated with a picosatellite (10 cm×10 cm×15 cm) dictated the requirements for the phase-conjugating array configuration. While the 10 cm×10 cm face could accommodate 16 antenna elements of a 4×4 array, other factors (such as dc power, internal housing size, weight, local oscillator power, etc.) were taken into consideration for the array architecture. Configuring 8 antenna elements in a cross configuration was deemed to be the optimal configuration for the particular form factor, requirements on size, weight, etc., and also resulted in adequate retrodirectivity as seen in the bistatic radar cross section results.

The signal strength depends on the link budget, which in turn depends on the local oscillator power, receiver sensitivity, and many other parameters. The signal shape should ideally be a beam small enough so that only one satellite is within its view angle. The beamwidth in turn is dependent on the size of the array. Interference between one satellite's response with another can be avoided by the use of coding or using slightly different frequencies for each crosslink. A third-party interrogator can be prevented from pinging a satellite with an onboard retrodirective array by using coded transmission. For a satellite to retrodirect signals over the entire 4π steradians of space, retrodirective arrays can be placed on all sides of a satellite. Alternatively, retrodirective arrays need not be affixed to the housing, but can be deployed similar to solar arrays. Optimal timing parameters, multi-satellite location algorithms, number of satellites, and signal interrogating/responding scheduling algorithms may be developed depending on the requirements and applications for the small-satellite network.

In summary, to accommodate self-steering signal transmission for randomly oriented satellites in space, the retrodirective array employs circularly polarized, two-dimensional steering. Quadruple subharmonic mixing is used as an effective means of achieving phase conjugation when a high-frequency LO is not feasible or inapplicable. The small-satellite network can also employ the aforementioned dual array system to direct a transmission signal peak superimposed with a jamming signal null toward the target and a jamming signal in other directions. The following describes examples of potential application environments for these invention features.

Nanosatellite Communications

Nanosatellites (satellites in near-earth orbit weighing 10 kg or less) are currently being developed to carry on a variety of scientific, weather, and communications tasks. These nanosatellites will in certain cases be able to perform similar functions to that of larger, much more expensive satellites. Communications aboard such small satellites will be of paramount concern. Retrodirective array technology will enable these satellites to communicate with ground stations and with other satellites using lower power consumption and complexity compared to conventional phased arrays. Moreover, the retrodirective feature of these arrays will enable communications even when the satellite has been placed in an orbit such that it rotates around one of its axes. This will help cut down on launch and design costs, and enable the design of relatively inexpensive boosters that can be greatly simplified, as they will not have to perform stabilization of the satellite itself prior to release.

The satellites themselves can be simplified, not needing stabilizing thrusters to maintain any particular rotational pattern. Retrodirective arrays and their supporting solar arrays can be applied in a conformal nature on the surface of the nanosatellite, simplifying design and reducing mission problems due to the failure of extendable solar arms to deploy. Such nanosatellite communications can support nanosatellites with other missions (e.g. reconnaissance, weather tracking, etc.) or can support nanosatellites dedicated to earth communications.

Nanosatellites thus equipped will be able to establish an inexpensive, secure communications constellation, which can support end-to-end earth communications using hops from nanosatellite to nanosatellite. The inexpensive cost of each satellite enables the launching of a great number of nanosatellites in nonprecise orbits. A combination of on-board and ground control station-based software algorithms will be used to dynamically route traffic between nanosatellites to ensure flow of data, and to reroute around broken links.

Secure Tactical Communications

Secure radios using retrodirective array/null array technology could be used to ensure that only a pencil-beamwidth of signal is sent between intended parties. The radios would communicate using a relay aboard a high-flying aircraft, satellite, unmanned aerial vehicle, or marine vessel. The relay station would contain encryption and authentication algorithms to ensure that each node of transmission is valid, from a "friendly." Null array technology would be used aboard both relay and edge devices to ensure that the signal is jammed in all other directions. This system could provide an added security feature to the Joint Tactical Radio System currently being developed by the US Department of Defense.

Search and Rescue/Enemy Location Fixing and Tracking

Arrays mounted aboard an aircraft or Unmanned Aerial Vehicle (UAV) could be configured to determine azimuth to a distant transmitter. Using triangulation, a series of azimuth readings and an on-board GPS system, the device would be able to pinpoint the grid location of a distant transmitter. Such a system could be used to rapidly locate a downed aircraft, by fixing on the signal produced by aircraft in distress (Emergency Locator Transmitter). The system could also be used by military systems to fix onto signals generated by enemy radio systems, thereby pinpointing enemy locations and enabling subsequent airstrikes or other appropriate action.

Unmanned Combat Aerial Vehicle (UCAV) Command, Control, and Reconnaissance

Military UCAVs need to be able to be controlled remotely, securely, and safely. Retrodirective array/null array technology can ensure that UCAVs can receive control signals from their control station, without jamming from potential hostile forces at other locations. Moreover, the reconnaissance data that such UCAVs receive can be transmitted to select receiver sites, with data signals in all other directions jammed by null array technology. In this way, the military will be able to securely control the UCAVs from a safe distance, while ensuring command and control of the UCAV and secure receipt of data returning from the UCAV. This functionality can be used to extend the usefulness of the Predator and other military UAV programs, which currently broadcast without these advantages.

Forest Fire Detection

Small temperature/wind detection devices parachuted to ground from cargo airplanes in mass numbers can be fitted with retrodirective arrays. These devices will have small on-board batteries with enough power to transmit up to 72 hours. Once dispersed, an orbiting aircraft or UAV can independently interrogate each device to determine the temperature, wind and other weather parameters at a large number of locations. The retrodirective technology can be used in conjunction with the UAV or aircraft's on-board navigational system and signal latency measuring devices to determine bearing and range of each device, and therefore, fix longitude and latitude for each. This data, gathered from each dispersed device and passed along to a control station by the UAV, can be used to determine dynamic temperature/weather patterns that would help pinpoint hotspots, or indicate to fire fighters which direction a fire may be headed.

Marine-Based Tracking

Small floating devices, equipped with retrodirective arrays and temperature, salinity and barometric pressure measuring tools and other detection devices as desired, can be dispersed by aircraft or ships in mass numbers. These devices will have rechargeable batteries and conformal solar array panels to ensure continuous operation. Once dispersed, an orbiting aircraft or UAV can independently interrogate each device to determine the temperature, wind, atmospheric pressure, weather, or other parameters at a large number of locations. The retrodirective technology can be used in conjunction with the UAV or aircraft's on-board navigational system and signal latency measuring devices to determine bearing and range of each device, and therefore, fix longitude and latitude for each. This data, gathered from each dispersed device and passed along to a control station by the UAV, can be used to study or predict marine migration patterns based on environmental conditions. This may help fishing fleets narrow in on likely spots with high concentrations of target species. Similar devices fitted with oil detection equipment may be used to track the spread of an oil slick or other contaminant. Weather data can also be provided to the National Oceanic and Atmospheric Administration and other weather agencies to help refine weather models based on sea conditions.

It is intended that the principles of the invention, as well as described embodiments, variations and applications for use be considered as within the spirit and scope of this invention, as defined in the following claims.

The invention claimed is:

1. A secure data transmission system for transmitting a data signal with high directivity toward a target while greatly reducing the likelihood of interception, comprising:
   (a) a self-phasing retrodirective array for receiving an interrogating signal from the target and transmitting a data signal beam with a peak directed back toward the target; and
   (b) a self-null-steering array for receiving the interrogating signal from the target and transmitting, in conjunction with said retrodirective array, a jamming signal with a null directed toward the target and the jamming signal in other directions,
   whereby the target can receive the data signal peak superimposed with the jamming signal null to maximize signal-to-noise (SNR) ratio in reception while the jamming signal is sent in the other directions.

2. A secure data transmission system according to claim 1, wherein said retrodirective array has self-phasing elements arranged in one layer, and said self-null-steering array has self-phasing elements arranged in another layer in tandem with the retrodirective array.

3. A secure data transmission system according to claim 1, wherein said retrodirective array has self-phasing elements integrated with self-phasing elements of said self-null-steering array in a common circuit layout.

4. A secure data transmission system according to claim 1, wherein said retrodirective array and said self-null-steering array are arranged to send a data signal peak and a jamming signal null with a SNR in the range of 20 dB or greater toward the interrogating target.

5. A secure data transmission system according to claim 1, wherein said self-null-steering array has self-phasing elements and a phase-conjugating circuit comprised of Schottky diodes mounted oppositely at each self-phasing element of the array, so that current flows in opposite directions while a local oscillator (LO) signal is applied in phase.

6. A secure data transmission system according to claim 1, wherein the dual array system is applied for data transmission in a short-distance wireless data transmission system.

7. A secure data transmission system according to claim 1, wherein the dual array system is applied for data transmission in a satellite TV system transmitting a narrow beam over a wide area to prevent piracy of TV signals in regions surrounding a target region.

8. A secure data transmission system according to claim 1, wherein the dual array system is applied for secure data transmission in any one of the group of applications consisting of: (a) nanosatellite communications; (b) secure tactical communications; (c) search and rescue location fixing and tracking; (d) military target location fixing and tracking; (e) unmanned aerial vehicle (UAV) command and control; (f) forest fire detection; (g) marine-based tracking; and (h) another application requiring secure communications with high signal directivity.

9. A secure data transmission method for transmitting a data signal with high directivity toward a target while greatly reducing the likelihood of interception, comprising:
   (a) employing a self-phasing retrodirective array to receive an interrogating signal from the target and transmit a data signal beam with a peak directed back toward the target; and
   (b) employing a self-null-steering array to receive the interrogating signal from the target and transmit, in conjunction with said retrodirective array, a jamming signal with a null directed toward the target and the jamming signal in other directions,
   whereby the target can receive the data signal peak superimposed with the jamming signal null to maximize signal-to-noise (SNR) ratio in reception while the jamming signal is sent in the other directions.

10. A secure data transmission method according to claim 9, wherein said data signal peak and jamming signal null are sent with a SNR in the range of 20 or greater toward the interrogating target.

11. A system for secure crosslink communications in a network of small-platform transponders moving in space, comprising:
   (a) a plurality of small-platform transponders each having a retrodirective antenna array for detecting the direction of an incoming interrogator signal and sending a response signal with a peak directed back toward the direction of the interrogator signal; and
   (b) said plurality of small-platform transponders operating together as a network of transponders by each one of said transponders establishing and maintaining a reliable crosslink with the other transponders without a priori knowledge of their positions by intermittently sending an interrogator signal to one or more other transponders and having the one or more other transponders send a response signal back to the one transponder,
   wherein each one of said network of transponders has a dual array system including a self-phasing retrodirective array for receiving an interrogating signal and transmitting a data signal beam with a peak directed back toward the interrogator position, and
   a self-null-steering array for receiving the interrogating signal and transmitting, in conjunction with said retrodirective array, a jamming signal with a null directed toward the interrogator position.

12. A system for secure crosslink communications in a network of small-platform transponders according to claim 11, wherein said network of transponders is a network of small-satellites in low earth orbit.

13. A system for secure crosslink communications in a network of small-platform transponders according to claim 12, wherein said network of small-satellites are nanosatellites in the 10 kg weight range and/or picosatellites in the 1 kg weight range.

14. A system for secure crosslink communications in a network of small-platform transponders according to claim 11, wherein the retrodirective array of each one of the transponders is configured for circularly polarized, two-dimensional steering.

15. A system for secure crosslink communications in a network of small-platform transponders according to claim 11, wherein said network of transponders is applied for secure data transmission for any one of the group of missions consisting of: (a) passive radiometry mission for high accuracy geolocation; (b) cluster augmentation for reliable data transmission on demand; (c) radar mission in locating and fixing targets; and (d) communications mission in narrow-beam, wide-area coverage.

16. A system for secure crosslink communications in a network of small-platform transponders according to claim 11, wherein said network of transponders is applied for secure data transmission in any one of the group of applications consisting of: (a) nanosatellite communications; (b) secure tactical communications; (c) search and rescue location fixing and tracking; (d) military target location fixing and tracking; (e) unmanned aerial vehicle (UAV) command and control; (f) forest fire detection; (g) marine-based tracking; and (h) another application requiring secure communications with high signal directivity.

17. A system for secure crosslink communications in a network of small-platform transponders according to claim 11, wherein each one of said network of transponders has a retrodirective array with 8 self-phasing elements arranged in a planar cross configuration, with 4 elements aligned in each orthogonal planar direction.

* * * * *